Nov. 14, 1961 F. G. WILLEY ET AL 3,008,372

CODE-WHEEL MANUFACTURING APPARATUS

Filed May 26, 1958 2 Sheets-Sheet 1

INVENTORS
FRANK G. WILLEY
RONALD F. MEYER
BY
Mitchell & Bechert
ATTORNEYS

CODE-WHEEL MANUFACTURING APPARATUS

Filed May 26, 1958 2 Sheets-Sheet 2

INVENTORS
FRANK G. WILLEY
RONALD F. MEYER
BY
Mitchell & Bechert
ATTORNEYS 3,008,372
CODE-WHEEL MANUFACTURING APPARATUS
Frank G. Willey, Roslyn Heights, and Ronald F. Meyer, New York, N.Y., assignors to Servo Corporation of America, New Hyde Park, N.Y., a corporation of New York
Filed May 26, 1958, Ser. No. 737,794
2 Claims. (Cl. 88—24)

This invention relates to electronic computing systems and in particular to methods and apparatus for making binary-coded discs particularly adapted for use in connection with analog-to-digital computers.

It is an object of the invention to provide an improved binary-coded disc of the character indicated.

It is another object to provide an improved method for producing a coded disc in which the code is developed as a function of angle about the disc axis.

A further object is to provide an improved means whereby binary-code markings may be automatically developed on a code disc or wheel, to extreme angular accuracy about the axis of rotation of the disc.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Briefly stated, the invention contemplates provision of an aligned plurality of lamps, and an optical system for focusing the images of the lamps, in radially spaced relation, on a slowly revolving transparent photographic disc or plate. In accordance with the method of the present invention the energization of the lamps is controlled by an electronic binary counter and associated relays, so as to selectively expose portions of concentric bands on the photo-sensitized disc, as traced by the image of each lamp. The exposures are timed automatically in accordance with a binary-code pattern, the timing being accurately based on precise angular increments of the disc about its axis. When the entire sequence of exposures is concluded (one revolution of the disc), the disc is processed through photographic development for converting the exposed segments of the concentric bands into opaque areas and the unexposed segments into transparent areas. The disc is then in a ready condition for use in analog-to-digital converters of the optical-electronic type.

Figure 1:
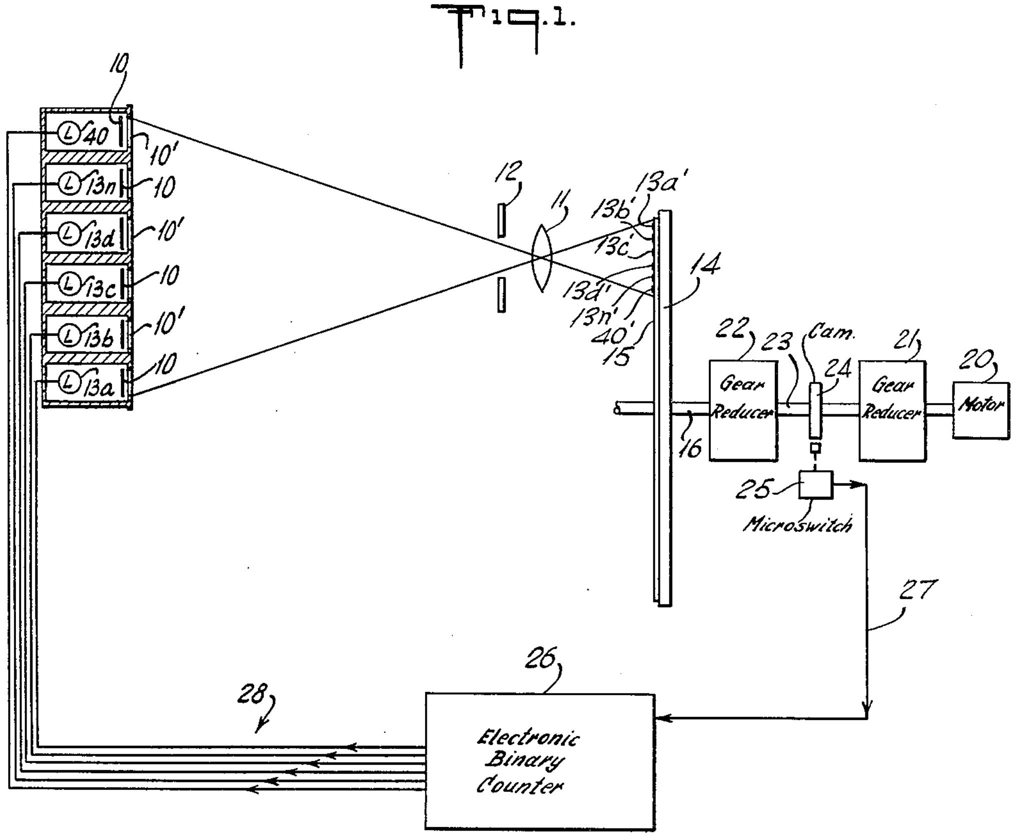
FIG. 1 is a diagrammatic illustration of apparatus for practicing the method of the invention.

Referring to FIG. 1, the apparatus of the invention is illustrated as including an optical system having a convex lens 11 and diaphragm 12 focusing the images of a rectilinear arrangement of a plurality of lamps 13*a*, 13*b*, 13*c*, 13*d* . . . 13*n* upon a radial line of a transparent disc 14 having a photosensitive coating 15. With a single-lens optical system, the images of the lamps on the photosensitive surface will be reversed and disposed at points 13*a'*, 13*b'*, 13*c'*, 13*d'* . . . 13*n'* on the radial line. Light from the individual lamps is preferably projected uniformly by lens 11, and we therefore suggest at 10 frosted glass or screen means behind radially elongated slits, there being one such slit 10' for each lamp, and the elongation axes of all slits being aligned, as in the plane of FIG. 1.

The disc 14 is disposed upon a shaft 16 which is supported on bearings (not shown), the shaft 16 being continuously driven by a motor 20 through gear reducers 21 and 22, the gear reducers being interconnected by a shaft 23. A cam 24 is mounted on shaft 23 for actuating a microswitch 25 which periodically triggers an electronic binary counter 26 through a cable 27, there being in the form shown one actuation of switch 25 for each rotation of shaft 23, so that the reduction ratio at 22 determines the basic number of unique markings that may be developed at 15, per rotation of disc 14. Electronic binary counter 26 provides pulses for selectively energizing the plurality of lamps 13 through a cable 28 connected therebetween. As an expedient, the selective energization follows a binary code pattern, each lamp representing one digit in the code.

Figure 2:
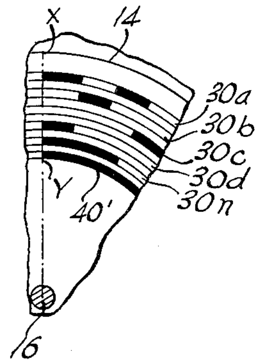
FIG. 2 is a view in partial elevation of a binary coded disc as processed in accordance with the invention.

From the foregoing, it can be seen that the intermittent light exposures upon the photosensitive surface 15 will, when the disc 14 is developed in a photographic process, produce concentric bands 30*a*, 30*b*, 30*c*, 30*d* . . . 30*n*, as shown in FIG. 2. Each band has transparent segments corresponding to the time intervals when its exposing lamp is unenergized and an opaque segment corresponding to the time interval when its exposing lamp is energized. It will be obvious to those skilled in the art that the sequence of transparent and opaque segments along any radial line on the disc 14 will establish the angular displacement of that line from the reference position XY which is established when the cam 24 effects the first actuation of microswitch 25.

In use, the coded bands are periodically radially scanned. To provide synchronization for such scanning a solid circular band 40' is developed concentrically with the coded bands 13*a'* . . . 13*n'*, by constantly energizing an additional lamp 40, included in the line of lamps 13*a*, 13*b* . . . 13*n*. The image 40' of this additional lamp will produce an arc on the disc 14 corresponding to the time interval for the entire coding of the disc.

Figure 3:
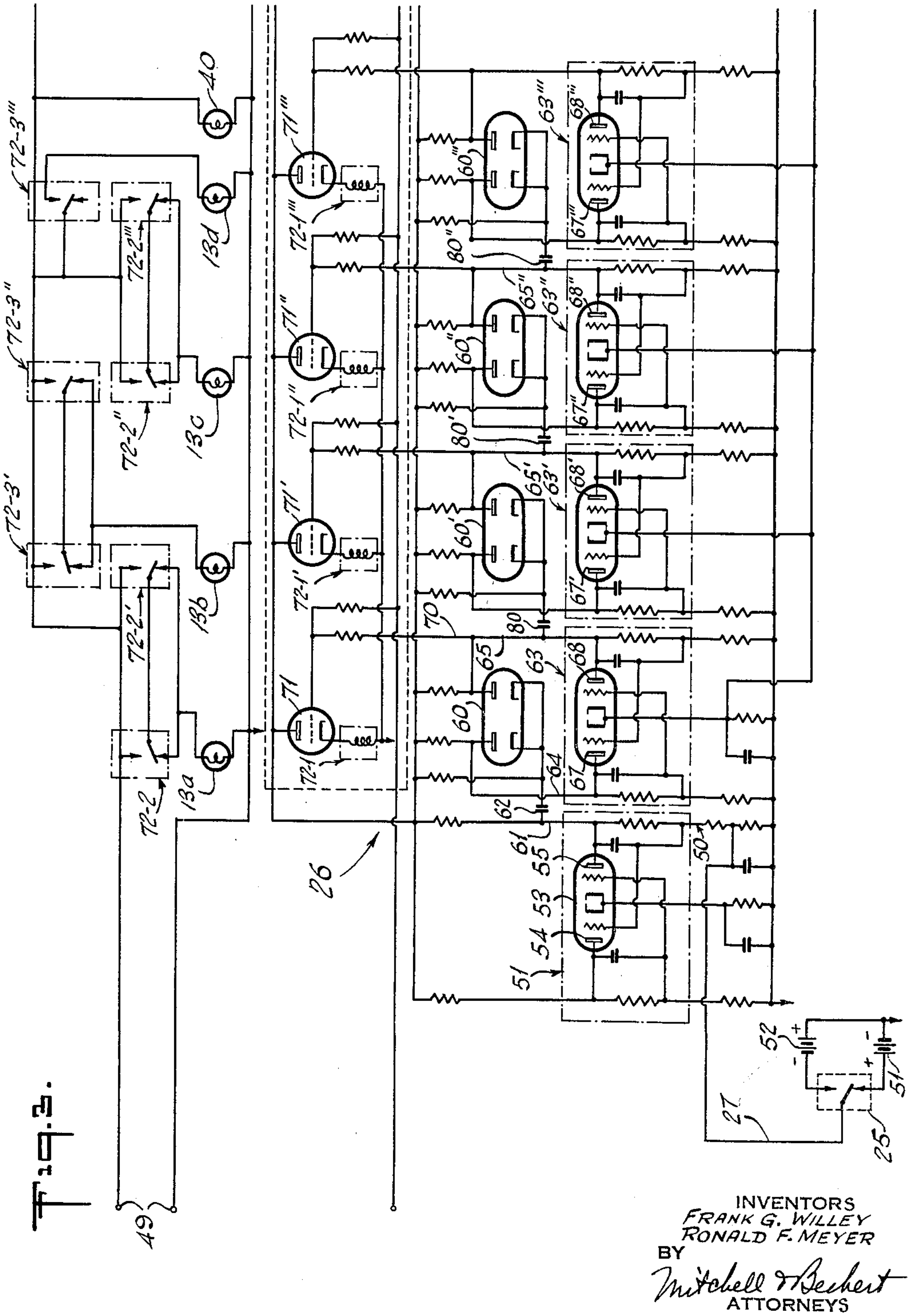
FIG. 3 is a partial schematic wiring diagram of one embodiment of an electronic binary counter for automatically controlling the exposures in the apparatus of FIG. 1

FIG. 3 illustrates one embodiment of the electronic binary counter 26 for effecting a four-digit coding of disc 14. The counter incorporates the four lamps 13*a*, 13*b*, 13*c*, and 13*d*, and additionally the synchronization lamp 40, lamp 40 being constantly energized by direct connections to a power line 49. It will be understood that there may be included further similar stages of the counter of FIG. 3, depending upon the desired number of digits in the binary code to be developed at 15.

As shown, microswitch 25 is of the single-pole double throw variety and is actuated once per revolution of the motor-driven cam 24. Switch 25 alternately applies, to conductor 27, either positive voltage from a D.-C. source 51 or a negative voltage from a D.-C. source 52. Conductor 27 is connected to an input circuit 50 of a bistable multivibrator 51, comprising a double-triode tube 53 having plates 54 and 55.

In its initial or reset state, multivibrator 51 (which may be termed the triggering multivibrator) is characterized by having its right-hand plate 55 at a positive voltage relative to its left-hand plate 54, for the time interval when microswitch 25 applies a positive voltage from source 51 to input circuit 50. When the microswitch 25 is activated by the cam it applies a negative voltage from source 52 to input circuit 50 causing multivibrator 53 to set (the voltage on plate 55 goes negative with respect to the voltage on plate 54). This setting and resetting occurs for each cycle of operation of microswitch 25. A decrease in the potential of plate 55 applies a negative pulse to the two cathodes of a double switching diode 60 via conductor 61 and coupling condenser 62. The left and right plates of switching diode 60 are connected to the left and right plates of another bistable multivibrator 63, by conductors 64 and 65, respectively. In its initial state, bistable multivibrator 63 is in a "reset" state having its left plate 67 at a positive potential relative to its right plate 68. The negative pulse passing through the switching diode 60 is applied to the control grids of the vacuum tubes of the bistable multivibrator 63, causing a change in stable states. The potential of its right plate 68 rises and through a connecting conductor 70, removes the negative cut-off bias voltage from the grid of a cathode follower 71. Cathode follower 71 controls a relay 72 which comprises a solenoid coil 72–1 disposed in the cathode circuit of cathode follower 71 and contacts which define a single-pole double-throw switch 72–2 disposed in the energization circuit of lamp 13*a*. As an aid in simplifying the explanation of the circuits, the corresponding components of the second, third and fourth stages will have the same reference number as the components of the first stage with the addition of prime ('), double prime ("), multiple prime (''') suffixes.

The second, third and fourth stages of the electronic binary counter 26, which control, respectively, relays 72', 72" and 72''' are similar and operate in a similar manner to the above described first stage.

Relays 72', 72", and 72''' are similar to relay 72 except that each is provided with additional contact sets that define second single-pole double-throw switches 72–3', 72–3" and 72–3''', respectively.

More specifically, the second, third and fourth stages are cascaded by coupling switching diode 60' to conductor 65 through condenser 80, switching diode 60" to conductor 65' through condenser 80', and switching diode 60''' to conductor 65" through condenser 80". Their associated bistable multivibrators 63', 63" and 63''' are in their "reset" states with their left plates 67', 67" and 67''' at a positive potential relative to their right plates 68', 68" and 68'''. As each bistable multivibrator 63 switches from "set" to reset negative pulses are transmitted to the preceding multivibrator to cause it to change state. Table I summarizes the counting of the binary counter 26, a one (1) indicates the associated bistable multivibrator is in a "set" state and a zero (0) indicates it is in a "reset" state.

*Table I*

| Number of operations of microswitch 25 | Bistable multivibrator | | | |
|---|---|---|---|---|
| | 63 | 63' | 63" | 63''' |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

Whenever a bistable multivibrator 63—63''' is in the "set" or one (1) state its associated cathode follower 71—71''' is conducting to energize the related relay 72–1 to 72–1'''. Although each relay can separately control an associated lamp 13(*a–d*) to give a straight binary pattern, as shown in Table I, it has been found that different sequential binary patterns are more desirable for analog to digital convertors. Codes such as the Gray code which change only one digit for each change in the count are subject to smaller reading errors. Accordingly, the relays 72—72''' are arranged in a matrix which energizes the lamps 13(*a–d*) in the sequence shown in Table II, wherein a one (1) associated with a lamp indicates the lamp is lit and a zero (0) indicates the lamp is out.

*Table II*

| Number of operations of microswitch 25 | Lamp | | | |
|---|---|---|---|---|
| | 13*a* | 13*b* | 13*c* | 13*d* |
| 1 | 1 | 0 | 0 | 0 |
| 2 | 1 | 1 | 0 | 0 |
| 3 | 0 | 1 | 0 | 0 |
| 4 | 0 | 1 | 1 | 0 |
| 5 | 1 | 1 | 1 | 0 |
| 6 | 1 | 0 | 1 | 0 |
| 7 | 0 | 0 | 1 | 0 |
| 8 | 0 | 0 | 1 | 1 |
| 9 | 1 | 0 | 1 | 1 |
| 10 | 1 | 1 | 1 | 1 |
| 11 | 0 | 1 | 1 | 1 |
| 12 | 0 | 1 | 0 | 1 |
| 13 | 1 | 1 | 0 | 1 |
| 14 | 1 | 0 | 0 | 1 |
| 15 | 0 | 0 | 0 | 1 |

From the foregoing, it will be apparent to those skilled in the art that the periodic actuation of microswitch 25 by motor driven cam 24 will sequentially "set" and "reset" bistable multivibrators 51, 63, 63', 63" and 63''' for effecting sixteen binary codes by energizing different combinations of lamps 13*a*, 13*b*, 13*c* and 13*d*. The sequence of light exposures on the turning photosensitized disc 14 will, when the disc is photographically developed, produce a disc as shown in FIG. 2.

There has thus been shown an improved means whereby binary-coded markings may be automatically developed on a code disc with extreme angular accuracy. Furthermore, in addition to providing an improved binary-coded disc, an improved method for producing such a disc having a very high degree of accuracy has been disclosed.

While the invention has been described in connection with the preferred forms and methods illustrated, it will be understood that modifications can be made within the scope of the invention as defined in the claims which follow.

What is claimed is:

1. Apparatus for making a coded disc, comprising a plurality of aligned lamps, a rotatably mounted disc having means for supporting photographic paper thereon, an optical system for focussing the images of said lamps in radially spaced relation on said disc, an electronic binary counter, means including said counter for selectively energizing said lamps so as to expose discrete portions of concentric bands on said photographic disc, said latter mentioned means comprising a power line, relays connected respectively between each lamp and said power line, a cathode follower connected in controlling relationship to each relay, a bistable multivibrator connected in controlling relationship to each cathode follower, a switching diode connected in controlling relationship to each bistable multivibrator, each switching diode after the first stage being connected in controlled relationship to the bistable multivibrator of each preceding stage, a triggering bistable multivibrator connected in controlling relationship to the switching diode of the first stage, means for periodically switching said triggering bistable multivibrator, means for rotating said disc at a predetermined speed, and means operated by the disc rotating means for controlling the binary counter selectively to energize said lamps for automatically timing the exposures in accordance with a binary code pattern, the timing being based on precise angular increments of the disc about its axis.

2. The combination as claimed in claim 1 wherein said triggering bistable multivibrator has a control circuit and said means for periodically switching said triggering bisable multivibrator includes a single-pole double-throw switch having a movable and two fixed contacts, said movable contact being connected to one side of said control circuit, two sources of D.-C. voltage, the positive side of one D.-C. voltage source being connected to the negative side of the other D.-C. voltage source and to the other side of said control circuit, each of the other sides of said two D.-C. voltage sources being respectively connected to one fixed contact of said single-pole double-throw switch, and a cam connected to and actuating said single-pole double-throw switch, said cam being driven by the disc rotating means.

References Cited in the file of this patent

UNITED STATES PATENTS

| | | |
|---|---|---|
| 2,102,708 | Howle | Dec. 21, 1937 |
| 2,533,242 | Gridley | Dec. 12, 1950 |
| 2,590,110 | Lippel | Mar. 25, 1952 |
| 2,760,404 | King | Aug. 28, 1956 |
| 2,784,397 | Branson et al. | Mar. 5, 1957 |
| 2,801,896 | Krahulec | Aug. 6, 1957 |
| 2,839,960 | Jones | June 24, 1958 |
| 2,899,673 | Reiner | Aug. 11, 1959 |